United States Patent [19]
Amano et al.

[11] Patent Number: 5,140,499
[45] Date of Patent: Aug. 18, 1992

[54] GAS-INSULATED SWITCHING DEVICE

[75] Inventors: Naoki Amano; Toru Tsubaki, both of Hitachi; Yoichiro Koizumi, Katsuta, all of Japan

[73] Assignee: Hitachi, Ltd., Tokyo, Japan

[21] Appl. No.: 722,227

[22] Filed: Jun. 27, 1991

[30] Foreign Application Priority Data

Jun. 27, 1990 [JP] Japan .................................. 2-166807

[51] Int. Cl.$^5$ ............................................. H02B 1/04
[52] U.S. Cl. ..................................... 361/341; 361/335; 361/355; 361/361
[58] Field of Search ....................... 200/148 B, 148 R; 361/332, 333, 335, 341, 342, 361

[56] References Cited

U.S. PATENT DOCUMENTS

| | | | |
|---|---|---|---|
| 4,241,379 | 12/1980 | Olsen | 361/335 |
| 4,967,307 | 10/1990 | Itou et al. | 361/335 |
| 5,001,599 | 3/1991 | Itou et al. | 361/341 |

FOREIGN PATENT DOCUMENTS

| | | |
|---|---|---|
| 0166184 | 10/1991 | European Pat. Off. . |
| 509044 | 5/1973 | Japan . |
| 62-23524 | 5/1987 | Japan . |

OTHER PUBLICATIONS

IEEE Transactions on Power Delivery, K. Ando, et al., vol. 3, No. 4, Oct. 1988, pp. 1588-1594.

*Primary Examiner*—Gregory D. Thompson
*Attorney, Agent, or Firm*—Antonelli, Terry, Stout & Kraus

[57] ABSTRACT

A gas-insulated switching device includes a bus bar-connecting conductor, within a cylindrical container, which connects one end of a circuit breaker portion, disposed wihtin the container, to a main bus bar mounted on the outer side of the container. The bus bar-connecting conductor is inclined relative to the axis of the container in such a manner that one end of the bus bar-connecting conductor connected to the main bus bar is situated closer to the other end of the breaker portion than to the one end of the breaker portion, and radially more outwardly of the breaker portion than the other end of the bus bar-connecting conductor connected to the one end of the breaker portion. As the bus bar-connecting conductor is inclined in the above manner, the device can be of a compact size without possibility of affecting the insulation between the bus bar-connecting conductor and the other end of the breaker portion by the voltage applied therebetween in the open or circuit-breaking state of the breaker portion.

8 Claims, 7 Drawing Sheets

GAS-INSULATED SWITCHING DEVICE

BACKGROUND OF THE INVENTION

1. Field of the Invention

This invention relates generally to a gas-insulated switching device, and more particularly to a gas-insulated switching device of the type in which a bus bar-connecting conductor, connecting a gas circuit breaker portion to a main bus bar conductor, is provided within a cylindrical container accommodating the circuit breaker portion.

2. Description of the Prior Art

Conventional gas-insulated switching devices of the type described are disclosed in Japanese Laid-Open (Kokai) Patent Application No. 50-9044 and U.S. Pat. No. 4,241,379.

The switching device disclosed in the above Japanese Laid-Open application is shown in FIG. 7. A plurality of circuit breaker portions 120 are arranged in parallel relation within a cylindrical container 110 in which electrically-insulating gas such as $SF_6$ is sealed. A lower end 121 of each circuit breaker portion 120 is supported by a dielectric support member 180 through a movable-side conductor 170 extending in the direction of the axis Z of the breaker portion 120. Although not shown, two main bus bars per phase are connected to the side of the cylindrical container 110. Each breaker portion 120 is electrically connected to main bus bar conductors of the corresponding main bus bars by bus bar-connecting conductors 150 and 160 extending radially of the cylindrical container 110, one ends 151 and 161 of the bus bar connecting conductors 150 and 160 being connected respectively to the main bus bar conductors whereas the other ends 152 and 162 thereof are connected to the movable-side conductors 170. Spacers 130 and 140 electrically insulate the main bus bar-connecting conductors 150 and 160 from the container 110, and also hermetically close openings 111 and 112, respectively, to isolate the gas within the container 110 from the gas in the neighbouring section or chamber. In the illustrated example, three breaker portions 120 constituting a three-phase construction are accommodated within the single container 110, and therefore three sets of identical arrangements (one of which is not shown) are provided.

FIGS. 8 to 10 shows the structure of the switching device disclosed in the above-mentioned U.S. Pat. No. 4,241,379. FIG. 8 is a block diagram incorporating an electric circuit. Three circuit breaker portions 220 are provided within a cylindrical container 210 in which electrically-insulating gas is sealed. A current transformer 290 and a grounding switch 310 are connected to one end 221 of the breaker portion 220. A bus bar-connecting conductor 250 extending radially of the cylindrical container 210, as well as a bus bar-connecting conductor 260 extending axially of the cylindrical container 210, are connected to the other end 222 of the breaker portion 220. Main bus bars 311 and 312 are connected to the outer side of the cylindrical container 210 via insulating spacers 230 and 240. A main bus bar conductor 313 is electrically connected to the bus bar-connecting conductor 250 via a disconnect switch 315, and a main bus bar conductor 314 is electrically connected to the bus bar-connecting conductor 260 via a disconnect switch 316. Components such as an insulation leading means or cable termination 318 and a voltage transformer 319 are connected to a side of one end 221 of the breaker portion 220 via a disconnect switch 317. That portion 201 of this gasinsulated switching device 200 corresponding to what is shown in FIG. 7 is shown in FIG. 9 on an enlarged scale.

As can be seen from FIG. 9, the end 222 of the breaker portion 220 is supported by a dielectric support member 280 through a movable-side conductor 270 extending axially of the breaker portion 220, as in the construction of FIG. 7. The main bus bar conductor 313 5 of the main bus bar 311 (one of the dual bus bars) connected through the insulating spacer 230 is electrically connected to the breaker portion 220 by the bus bar-connecting conductor 250 extending radially of the cylindrical container 210, one end 251 of the bus bar-connecting conductor 250 being connected to the main bus bar conductor 313 whereas the other end 252 thereof is connected to the movable-side conductor 270. The main bus bar conductor 314 of the main bus bar 312 (the other of the dual bus bars) connected through the insulating spacer 240 is electrically connected to the breaker portion 220 through the bus bar-connecting conductor 260 extending generally axially of the cylindrical container 210, one end 261 of the bus bar-connecting conductor 260 being connected to the main bus bar conductor 314 whereas the other end 262 thereof is connected to the bus bar-connecting conductor 250. FIG. 10 is a plan view taken along the line X—X of FIG. 9, and in this Figure, three sets of arrangements constituting a three-phase construction are shown as received within the cylindrical container 210.

In the conventional gas-insulated switching device 100 shown in FIG. 7, the bus bar-connecting conductors 150 and 160, which extend horizontally and radially outwardly from the two axially-spaced portions of the movable-side conductor 170 connected to the end 121 of each breaker portion 120, are connected respectively to the two main bus bars of each phase connected to the outer side of the cylindrical container 121. Therefore, the movable-side conductor 170 need to have the axial length larger than the length (in the axial direction Z) required for two sets of main bus bars. As a result, the axial length of the cylindrical container 110 tends increase, so that the size of the gas-insulated switching device is increased.

On the other hand, in the switching device 200 shown in FIG. 9, the bus bar-connecting conductor 260 is bent in such a manner that one end 261 of the bus bar-connecting conductor 260 (the other end 262 of which is electrically connected to a side of one end 222 of the breaker portion 220) is disposed on the side of the other end 221 of the breaker portion 220. Therefore, the axial length of the cylindrical container 210 is reduced, and the gas-insulated switching device 200 can be of a compact size. However, in an open circuit condition of the breaker portion 220, an interelectrodes voltage is applied between the bus bar-connecting conductor 260 and the end portion 221 of the breaker portion 220, and therefore the conductor 260 and the end portion 221 should be spaced a predetermined distance from each other for insulation purposes therebetween. In addition, a certain distance between the bus bar-connecting conductor 260 and the cylindrical container 210, which is required for insulation purposes, must also be taken into consideration. As a result, in the switching device 200, the diameter of the cylindrical container 210 must be increased.

SUMMARY OF THE INVENTION

It is an object of this invention to provide a gas-insulated switching device in which the size of a cylindrical container can be reduced in its axial and radial directions.

According to the present invention, the above object has been achieved by a gas-insulated switching device which includes a bus bar-connecting conductor, within a cylindrical container, which connects one end of a circuit breaker portion, disposed within the container, to a main bus bar mounted on the outer side of the container, the bus bar-connecting conductor being inclined relative to the axis of the container in such a manner that one end of the bus bar-connecting conductor connected to the main bus bar is situated closer to the other end of the breaker portion than to the one end of the breaker portion, and radially more outwardly of the breaker portion than the other end of the bus bar-connecting conductor connected to the one end of the breaker portion. As the bus bar-connecting conductor is inclined in the above manner, the device can be of a compact size without possibility of affecting the insulation between the bus bar-connecting conductor and the other end of the breaker portion by the voltage applied therebetween in the open or circuit-breaking stat of the breaker portion.

DETAILED DESCRIPTION OF THE PREFERRED EMBODIMENTS

First, a gas-insulated switching device 90 according to a preferred embodiment of the present invention will now be described with reference to FIGS. 1 to 4.

Figure 1:
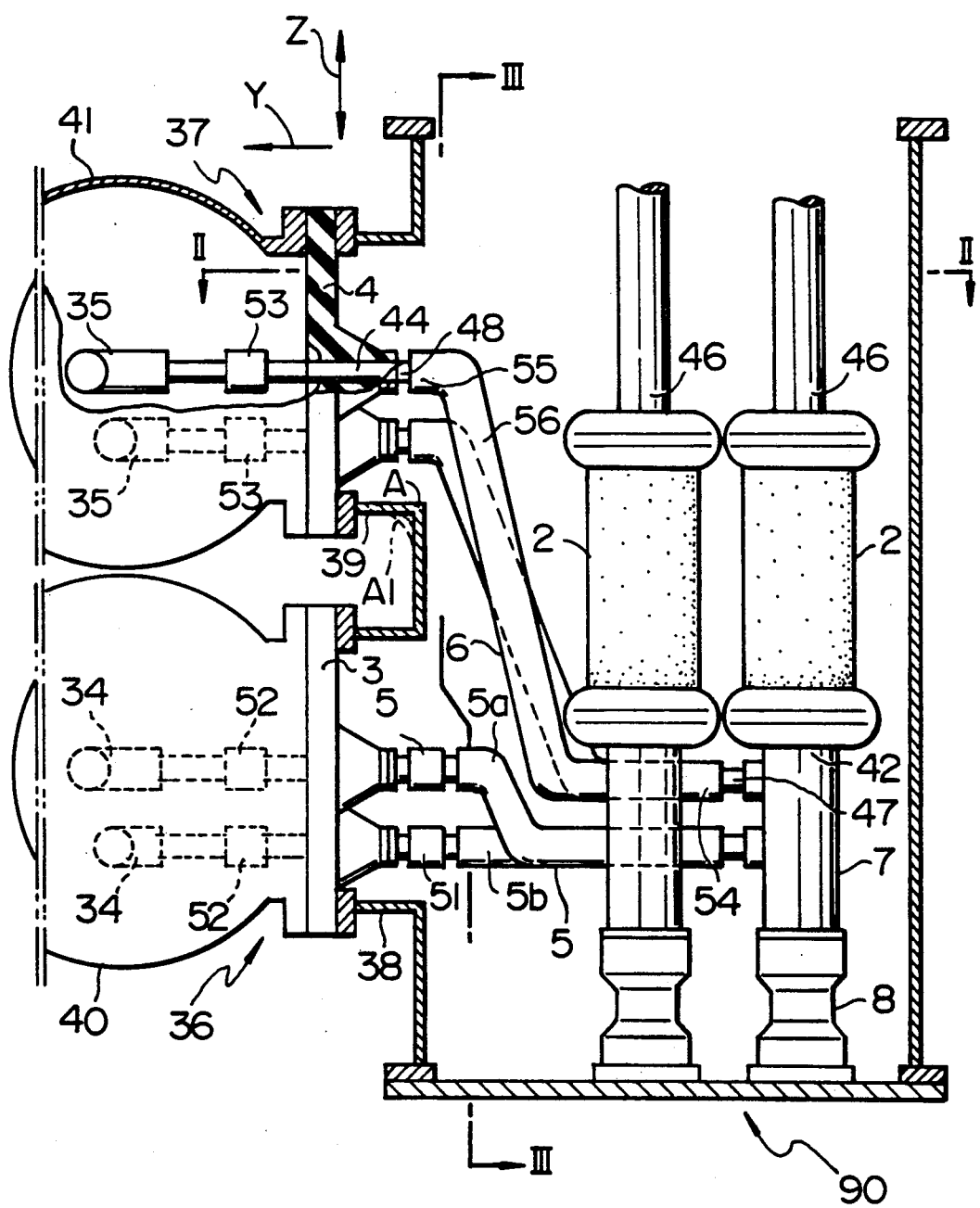
FIG. 1 is a vertically sectional, front-elevational view of a main portion of a gas-insulated switching device according to a preferred embodiment of the present invention taken along a line I—I of FIG. 2.
Figure 2:
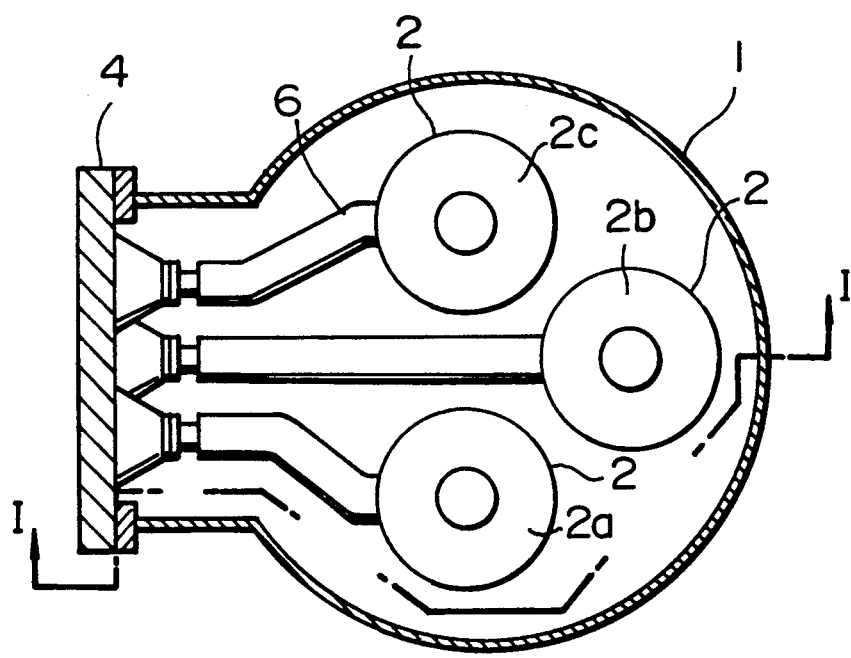
FIG. 2 is a horizontally sectional view taken along a line II—II of FIG. 1.
Figure 4:
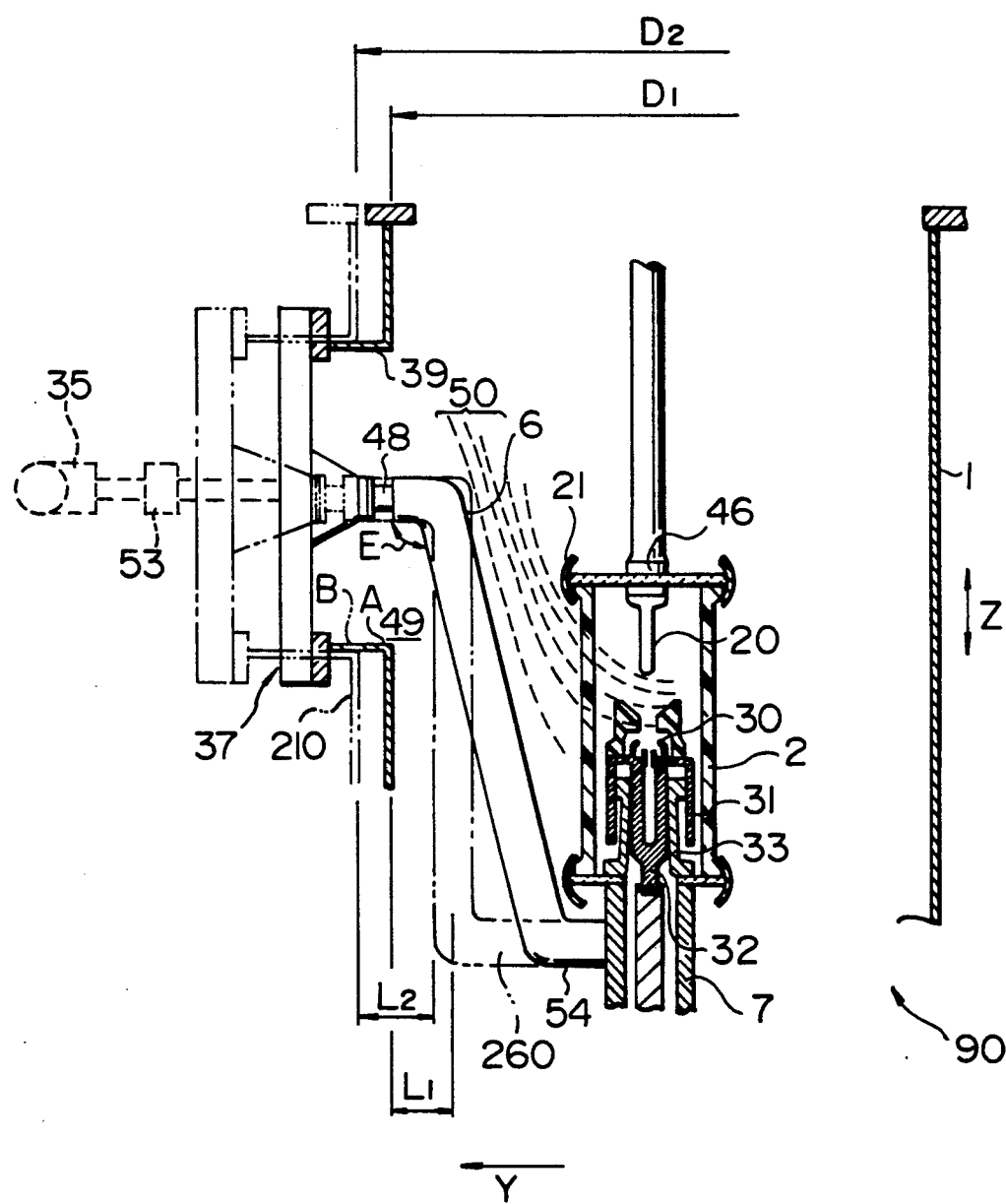
FIG. 4 is an enlarged sectional view of a part of the switching device of FIG. 1.
Figure 7:
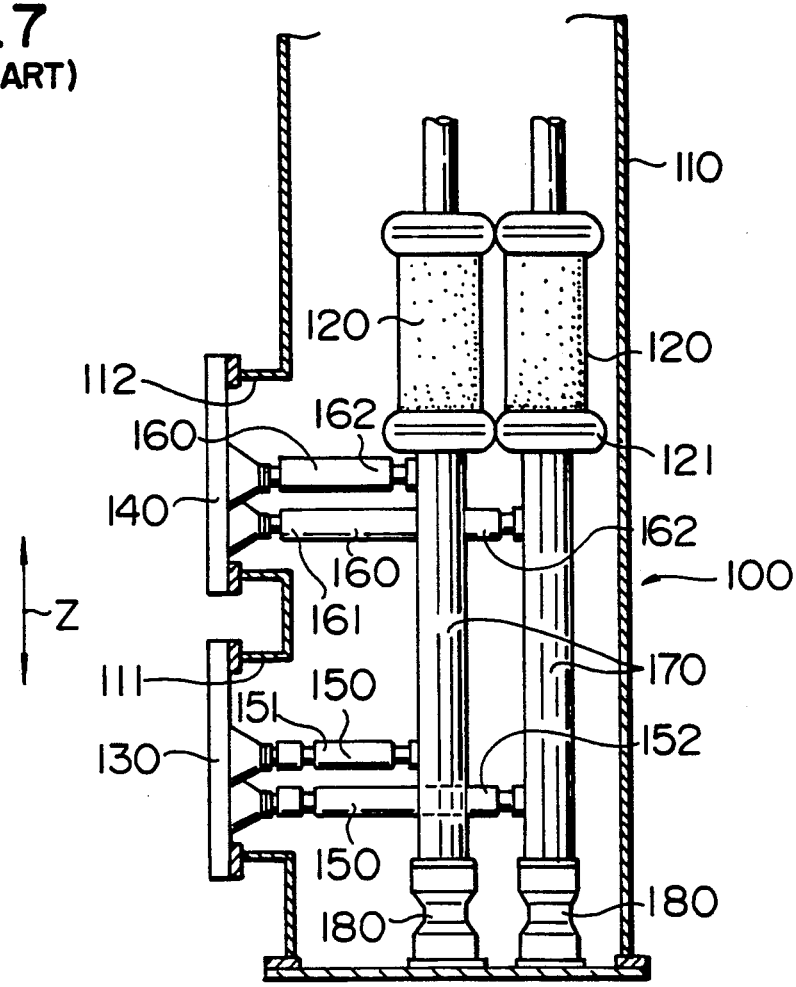
FIG. 7 is a vertically sectional, frontelevational view of a conventional gas-insulated switching device.

As shown in FIGS. 1 and 2, three circuit breaker portions 2 of a generally cylindrical shape are mounted within a cylindrical container 1 in such a manner that the axis of each breaker portion 2 is parallel to the axis of the container 1 extending in a direction Z. The three breaker portions 2 correspond to lines of three phases, respectively. The breaker portion 2 is a so-called large-power circuit breaker (e.g. puffer-type circuit breaker) utilizing gas. Each breaker portion 2 is supported through a movable-side conductor 7 of a relative short length and an insulating or dielectric support member 8 which is disposed coaxially with the movable-side conductor 7. As shown in FIG. 4, a puffer cylinder 31 (which is movable in the direction Z) is in sliding contact with a puffer piston 33 integral with the movable-side conductor 7, so that a movable electrode or contact 30 is electrically connected to the conductor 7. Two set of main bus bars 34 and 35 of a dual bus bar system for a three-phase alternating current are connected to an outer side of the cylindrical container 1 at connecting portions 36 and 37 (bus bars of the other one of the three-phase lines are not seen in FIG. 1). The connecting portions 36 and 37 have respective cylindrical extensions 38 and 39 extending radially outwardly (i.e., in a direction Y) from the cylindrical container 1, and respective insulating or dielectric spacers 3 and 4. The insulating spacer 3 is mounted between the extension 38 and a container portion 40 accommodating the main bus bars 34, while the insulating spacer 4 is mounted between the extension 39 and a container portion 41 accommodating the main bus bars 35. The insulating spacers 3 and 4 electrically insulate the containers 1, 40 and 41 from the bus bars 34 and 35, etc., and electrically insulate the three-phase bus bars 34 or 35 of the dual bus bar system from each other, and isolate or separate the gaseous atmosphere in the container 1 from the gaseous atmosphere in each of the containers 40 and 41. Particularly, the insulating spacer 3 disposed adjacent to the lower main bus bars 34 is disposed in generally radially-opposed relation to the movable-side conductor 7, and the insulating spacer 4 disposed adjacent to the upper main bus bars 35 is disposed above the insulating spacer 3. Therefore, the cylindrical container 1 is reduced in axial length (in the direction Z) than the cylindrical container 110 of the gas-insulated switching device shown in FIG. 7.

Figure 3:
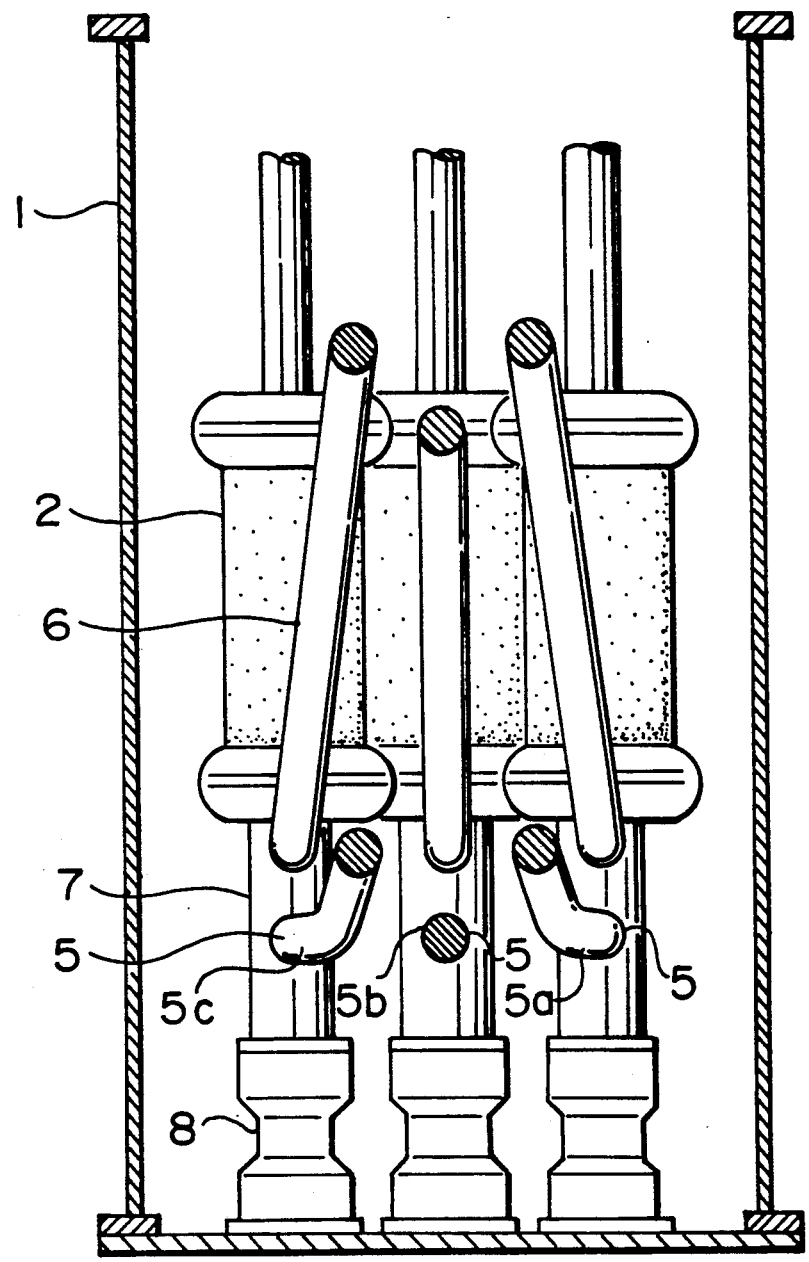
FIG. 3 is a vertically sectional side view taken along a line III—III of FIG. 1.

Bus bar-connecting conductors 5, which respectively connect the movable-side conductors 7, 5 disposed below one ends 42 of the breaker portions 2, to main bus bar conductors 34 through the insulating spacer 3, are disposed in a generally radial direction Y of the cylindrical container 1. The three breaker portions 2 constituting the three-phase lines are provided within the container 1, and therefore two (5a and 5c) of the three bus bar-connecting conductors 5a, 5b and 5c for the three-phase lines are slightly bent as shown in FIG. 3 in order that the two conductors 5a and 5c can be spaced from the other conductor 5b for electrical insulation purposes, and also in order that the spatial arrangement of the three conductors 5a, 5b and 5c corresponds to the spatial arrangement of embedded conductors (which are not shown, but similar to embedded conductors 44 embedded in the insulating spacer 4) embedded in the spacer 3. On the other hand, bus bar-connecting conductors 6, which respectively connect the movable-side conductors 7, disposed below one ends 42 of the breaker portions 2, to main bus bar conductors 35 via the insulating spacer 4, are inclined relative to the axial direction Z of the cylindrical container 1. More specifically, each bus bar-connecting conductor 6 is inclined such that its lower portion is directed toward or approaches one end 42 of the corresponding breaker 2 or the corresponding movable-side conductor 7 whereas its upper portion is directed radially away from the other end 46 of the corresponding breaker portion 2. In other words, the bus bar-connecting conductor 6 is connected at its one end 47 to the movable-side conductor 7 disposed below the lower end 42 of the breaker portion 2, and is also connected at its other end 48 (which is disposed above the one end 47) to the main bus bar conductor 35 via the embedded conductor 44 in the insulating spacer 4, and the bus bar-conducting conductor 6 is inclined such that its other end 48 is disposed above and radially outwardly of its one end 47.

The thus inclined arrangement of the bus bar-connecting conductor 6 is desirable from the viewpoint of electrical insulation. Namely, as shown in FIG. 4, the connection between the main bus bar conductor 35 and the bus bar connecting conductor 6 is established at the connecting portion 37 formed at the extension or branch portion 39 of the cylindrical container 1. As a result of the presence of this branch portion 39, a generally right-angular corner A is formed on the cylindrical container 1. In the case of the conventional device of FIGS. 8 to 10, a corresponding corner B shown by phantom or imaginary lines (dots-and-dash lines) is formed, and an insulation distance L2 must be provided between this corner B and the bus bar-connecting conductor 260 (shown by imaginary lines), because a generally right-angularly bent space is formed between the conventional cylindrical container 210 having the corner B, and the bus bar-connecting conductor 260, as can be seen from FIG. 4.

Figure 8:
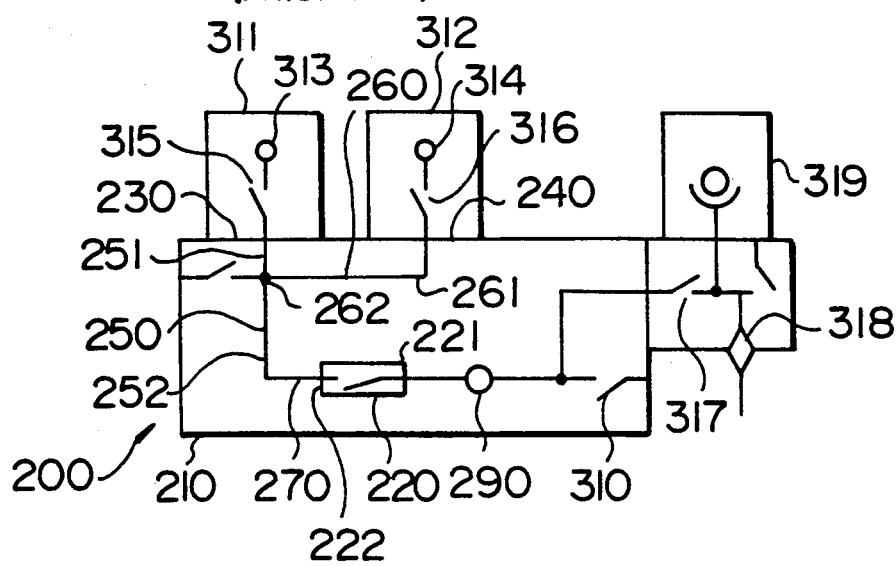
FIG. 8 is a schematic front-elevational view of an other conventional gas-insulated switching device.
Figure 9:
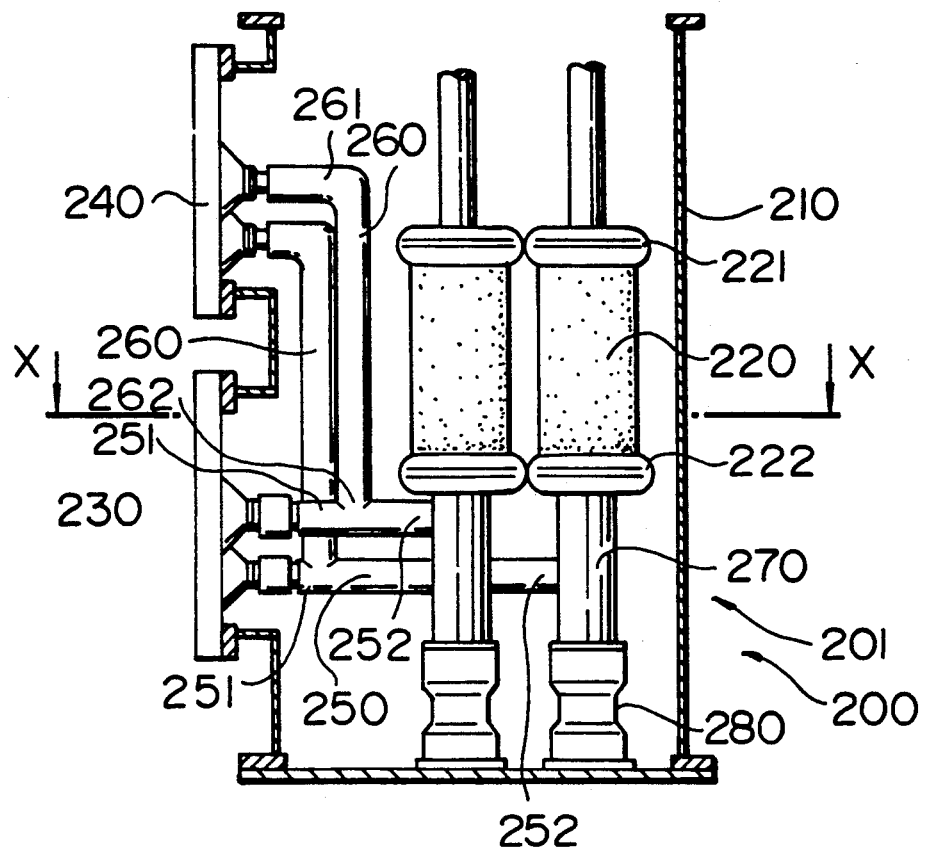
FIG. 9 is an enlarged, sectional view of a main portion of the switching device of FIG. 8.
Figure 10:
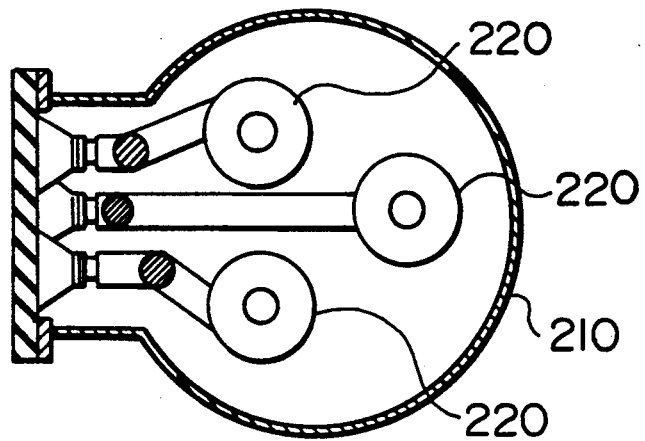
FIG. 10 is a sectional plan view of the switching device of FIG. 9.

On the other hand, in this embodiment, as indicated by solid lines in FIG. 4, because the bus bar-connecting conductor 6 is inclined to become closer to the movable-side conductor 7 radially inwardly relative to the corresponding breaker portion 2 as the conductor 6 extends downwardly, the distance between the corner A and the bus bar-connecting conductor 6 is greater than that in case of the conventional device 200 of FIGS. 8 to 10, and a space 49 formed between the cylindrical container 1 with the corner A and the bus bar-connecting conductor 6 is bent at an obtuse angle corresponding to the angle E of the inclined bus bar-connecting conductor 6. As a result, the electric field in the space 49 is weakened. Therefore, the distance L1 between the corner A of the cylindrical container 1 and the bus bar-connecting conductor 6 can be decreased, and the diameter D1 of the cylindrical container 1 can be smaller than the diameter D2 of the conventional cylindrical container 210. The corner A of the container 1 may be rounded as indicated by imaginary lines A1 in FIG. 1.

FIG. 4 shows an opened state of the breaker portion 2 in which the movable contact 30 is spaced apart from a stationary contact or electrode 20. When the breaker portion 2 is in its closed state in which the movable contact 30 is in contact with the stationary contact 20, the distance between the upper end 46 of the breaker portion 2 (where the stationary contact 20 is provided) and the bus bar-connecting connector 6 is reduced due to the reduction in the diameter D of the cylindrical container 1; however, in this closed state, the bus bar-connecting conductor 6 and the stationary contact 20 are at the same electric potential, and therefore there is no problem with insulation. On the other hand, in the opened state shown in FIG. 4, the voltage between the electrodes 20, 30 is also applied between the end 46 (where the stationary contact 20 is provided) and the bus bar-connecting conductor 6; however, this interelectrode voltage does not particularly pose any problem with this switching device 90. The reason follows. The electric field at the distal end of the stationary contact 20 in the opened state is determined substantially by the position of the distal end of the stationary contact 20 and a member such as, and electric field-relaxing or weaking shield 21 for preventing occurrence of locally concentrated or increased electric field which is disposed rearwardly of the stationary contact 20 and has the same electric potential as that of the stationary contact 20. If the bus bar-connecting conductor 6 is ignored, the equipotential lines or faces perpendicular to the electric field are generally curved convexly downwardly as indicated by dashed-lines 50. As described above, the bus bar-connecting conductor 6 is inclined in such a manner as to be directed more radially outwardly toward its upper end, which results in a fact that the bus bar-connecting conductor 6 is inclined generally along the curved lines 50. Therefore, the bus bar-connecting conductor 6 will not disturb the electric field formed by the distal end portion of the stationary contact 20, but can rather correct the electric field into a desired condition in such a manner as to prevent the concentration of the electric field, more specifically, concentration of electric line of force.

Therefore, although the distance between the bus bar-connecting conductor 6 and the electric field-weakening shield 21 is decreased, the potential distribution is improved, so that problem of the electric insulation does not arise.

In the above embodiment, although the circuit breaker portions 2a, 2b and 2c for the three lines of the three-phase alternating current are accommodated within the single container 1, these breaker portions 2a, 2b and 2c may be accommodated within separate containers, respectively. Moreover, two circuit breaker portions of a single-phase alternating current instead of the three-phase alternating current may be accommodated in a single container or respective separate containers (These will be readily appreciated from FIGS. 1 to 4, and therefore are not shown in the drawings).

In the above embodiment, reference numerals 51, 52 and 53 denote disconnect switches which are provided for changing the connection of the dual bus bars, for the grounding upon maintenance or the like. A third disconnect switch (not shown) has similar function for a three phase A.C. system.

In the switching device shown in FIGS. 1 to 4, each of the bus bar-connecting conductors 6 more specifically has an inner horizontal-extension portion 54 connected to the movable-side conductor 7, an outer horizontal-extension portion 55 connected to the corresponding embedded conductor 44 in the insulating spacer 4, and a straight inclined portion 56 extending between the two horizontal-extension portions 54 and 55. The straight inclined portion 56 may be curved, depending on the arrangement of the neighboring parts.

Next, two other embodiments of the present invention will be described with reference to FIGS. 5 and 6, respectively. Those parts or elements of devices of FIGS. 5 and 6 corresponding to those of the device of FIGS. 1 to 4 are designated by identical reference numerals, respectively.

Figure 5:
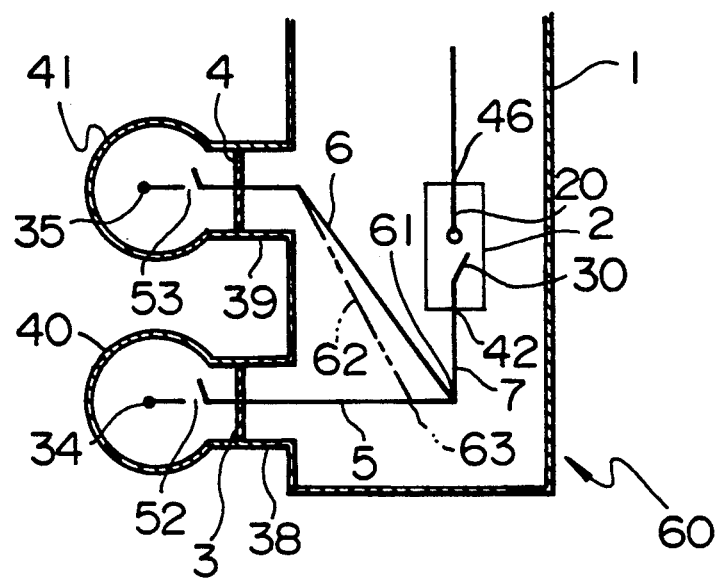
FIGS. 5 and 6 are schematic front-elevational views of gas-insulated switching devices according to other embodiments of the invention, respectively.

FIG. 5 is a schematic front-elevational sectional view of a gas-insulated switching device 60 according to another embodiment of the present invention, showing an associated electric circuitry (for the sake of simplicity of the illustration, only one line of three-phase and dual bus bar system is shown). In this embodiment, a lower end portion 61 of the inclined bus bar-connecting conductor 6 is extended straight, and is connected to a movable-side conductor 7 supporting the circuit breaker portion 2 coaxially therewith. Namely, in the device 60 of FIG. 5, instead of providing the inner horizontal-extension portion 54 (FIG. 1), the inclined portion 56 is extended directly to the movable-side conductor 7. The bus bar-connecting conductor 5, extending horizontally to connect the lower main bus bar 34 to the lower end 42 of the breaker portion 2, is connected to the movable-side conductor 7 at generally the same position where the lower end 61 of the bus bar-connecting conductor 6 is connected to the movable-side conductor 7. It is clear that this device 60 has advantageous effects similar to those of the device 90 of FIGS. 1 to 4. Meanwhile, as shown in an imaginary line 62 in FIG. 5, the inclined bus bar-connecting conductor, instead of being connected to the movable-side conductor 7, may be connected at its lower end 63 directly to the bus bar-connecting conductor 5.

Figure 6:
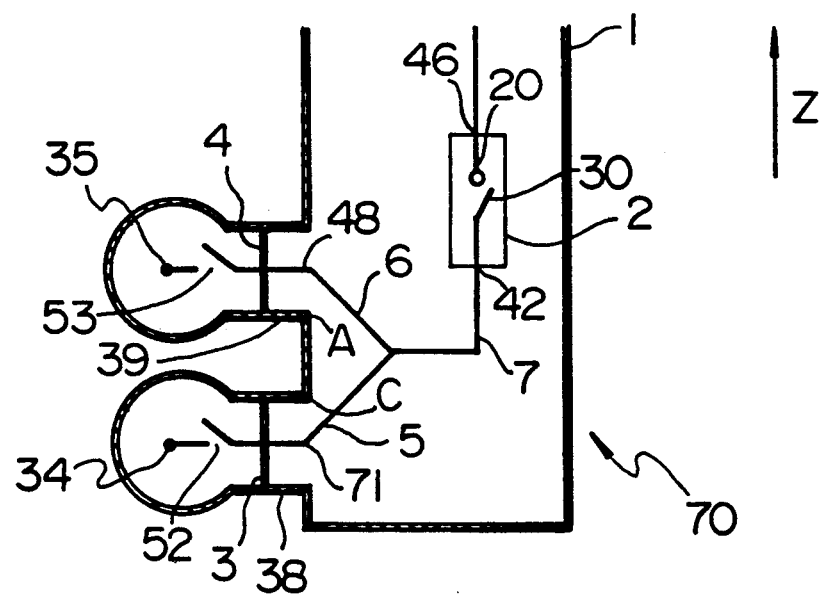

FIG. 6 is a schematic front-elevational sectional view of a gas-insulated switching device according to a further embodiment of the invention, showing an associated electric circuitry, similarly with FIG. 5.

In this embodiment, the bus bar-connecting conductor 6, which connects the upper main bus bar 35, disposed close to the circuit breaker portion 2, to the lower end 42 of the breaker portion 2, is inclined relative to the axial direction Z of the cylindrical container 1 such that the bus bar-connecting conductor 6 is bent toward the breaker portion 2 and in such a manner that one end 48 of the bus bar-connecting conductor 6 connected to the upper main bus bar 35 is radially more remote from the breaker portion 2 than the other or lower end thereof, as in the device 90 of FIGS. 1 to 4. On the other hand, the bus bar-connecting conductor 5, which connects the breaker portion 2 to the lower one (34) of the dual main bus bars 34 and 35 juxtaposed parallel at the outer side of the cylindrical container 1, is inclined relative to the axial direction Z of the cylindrical container 1 in such a manner that the bus bar-connecting conductor 5 is extended downwardly of the breaker portion 2 in contrast with the upwardly extended bus bar-connecting conductor 6 and in such a manner that one end 71 of the bus bar-connecting conductor 5 connected to the main bus bar 34 is radially more remote from the breaker portion 2 than the other or upper end thereof.

In the device 70 of this embodiment, the axial length of the cylindrical container 1 is slightly greater than that of the device 90 of FIG. 1; however, similar advantages as those achieved by the device 90 can also be obtained. And besides, the effect, similar to the effect of the improved potential distribution at the region between the corner A of the branch portion 39 of the cylindrical container 1 and the bus bar-connecting conductor 6 (which has been explained with reference to FIG. 4), can be expected also at a region between a corner C of the branch portion 38 and the bus bar-connecting conductor 5.

In all of the above-mentioned embodiments, the dual bus bar system is employed, and two main bus bars 34 and 35 per transmission line are provided. However, even in the case of a single bus bar system using only the main bus bar 35 for each transmission line, the advantageous effects on the electric potential distribution achieved by the use of the inclined bus bar-connecting conductor 6 in the devices 90, 60 and 70 can be similarly obtained, for example, when the space for the main bus bar 34 is not available due to presence of other equipments.

The present invention is not limited to the embodiments described above.

As described above, in the present invention, because the bus bar-connecting conductor, which connects one end of the circuit breaker portion to the main bus bar, is inclined such that the bus bar-connecting conductor is bent toward the other end of the breaker portion, and such that the bus bar-connecting conductor is directed away from the other end of the breaker portion, the axial length and diameter of the cylindrical container accommodating the breaker portions can be reduced without affecting the potential distribution.

What is claimed is:

1. A gas-insulated switching device comprising:
   a cylindrical container having insulating gas sealed therein;
   at least one circuit breaker portion mounted within said cylindrical container;
   an axis of said at least one circuit breaker portion disposed generally parallel to an axis of said cylindrical container;
   at least one main bus bar connected to a side of said cylindrical container; and
   at least one bus bar-connecting conductor mounted within said cylindrical container and connecting said at least one main bus bar to one end of said at least one circuit breaker portion, said at least one bus bar-connecting conductor being inclined relative to said axis of said cylindrical container, wherein a distance between one end of said at least one bus bar-connecting conductor connected to said at least one main bus bar and another end of said at least one circuit breaker portion is less than a distance between said one end of said at least one bus bar-connecting conductor and said one end of said at least one circuit breaker portion, said one end of said at least one bus bar-connecting conductor being positioned more radially outwardly with respect to said at least one circuit breaker portion than another end of said at least one bus bar-connecting conductor connected to said one end of said at least one circuit breaker portion.

2. A device according to claim 1, wherein said cylindrical container has a branch portion extending radially outwardly from a peripheral wall thereof, the connection between said at least one bus bar-connecting conductor and said at least one main bus bar being located near at said branch portion.

3. A device according to claim 2, in which said at least one circuit breaker portion has a stationary contact provided at said another end of said at least one circuit breaker portion.

4. A gas-insulted switching device comprising:
   a cylindrical container having insulating gas sealed therein;
   at least one circuit breaker portion disposed within said cylindrical container, wherein an axis of said at least one circuit breaker portion is generally parallel to an axis of said cylindrical container;
   at least one pair of main bus bars, comprising a dual system, connected to a side of said cylindrical container, and spaced from each other in a direction of said axis of said cylindrical container;
   at least one pair of bus bar-connecting conductors disposed within said cylindrical container, and respectively connecting corresponding one of said at least one pair of main bus bars to one end of said at least one circuit breaker portion, one of said at lest one pair of bus bar-connecting conductors being connected to said one of said at least one pair of main bus bars and being positioned near another end of said at least one circuit breaker portion, said one of said at least one pair of bus bar-connecting conductors being connected to said one end of said at least one circuit breaker portion, said one of said at least one pair of bus bar-connecting conductors being inclined relative to said axis of cylindrical container, wherein one end of said one of said at lest one pair of bus bar connecting conductors connected to said one of said at least one pair of main bus bars is positioned closer to said another end of said at least one circuit breaker portion than to said one end of said at least one circuit breaker portion and positioned more radially outwardly of said at least one circuit breaker portion than another end of said one of said at least one pair of bus bar-connecting conductors connected to said one end of said at least one circuit breaker portion.

5. A device according to claim 4, wherein said cylindrical container has a branch portion extending radially outwardly from a peripheral wall thereof, a connection between said one of said at least one pair of bus bar-connecting conductors and said one o said at lest one pair of main bus bars being located at said branch portion.

6. A device according to claim 5 wherein said one of said at least on pair of bus bar-connecting conductors has a portion near said another end thereof connected to said one end of said at least one circuit breaker portion, said portion extending in a direction generally perpendicular to said axis of said cylindrical container.

7. A device according to claim 5, wherein said one of said at least one pair of bus bar-connecting conductors from said another end thereof and is connected to said at least one circuit one end of said breaker portion, said one of said at least one pair of bus bar-connecting conductors being inclined with respect to the axis of said cylindrical container.

8. A device according to claim 5, wherein another of said at least one pair of bus bar-connecting conductors connected to another of said at least one pair of main bus bars is positioned near said one end of said at least one circuit breaker portion, said another of said at least one pair of bus bar-connecting conductors being inclined relative to said axis of said cylindrical container, wherein one end of said another of said at least one pair of bus bar-connecting conductors connected to said another of said at least one pair of main bus bars is opposed to said another end of said at least one circuit breaker portion with respect to said one end of said at least one circuit breaker portion in said axial direction of said cylindrical container, said another of said at least one pair of bus bar-connecting conductors extending away from said one end of said at lest one circuit breaker portion in a direction radially outwardly of said at least one circuit breaker portion.

* * * * *